UNITED STATES PATENT OFFICE.

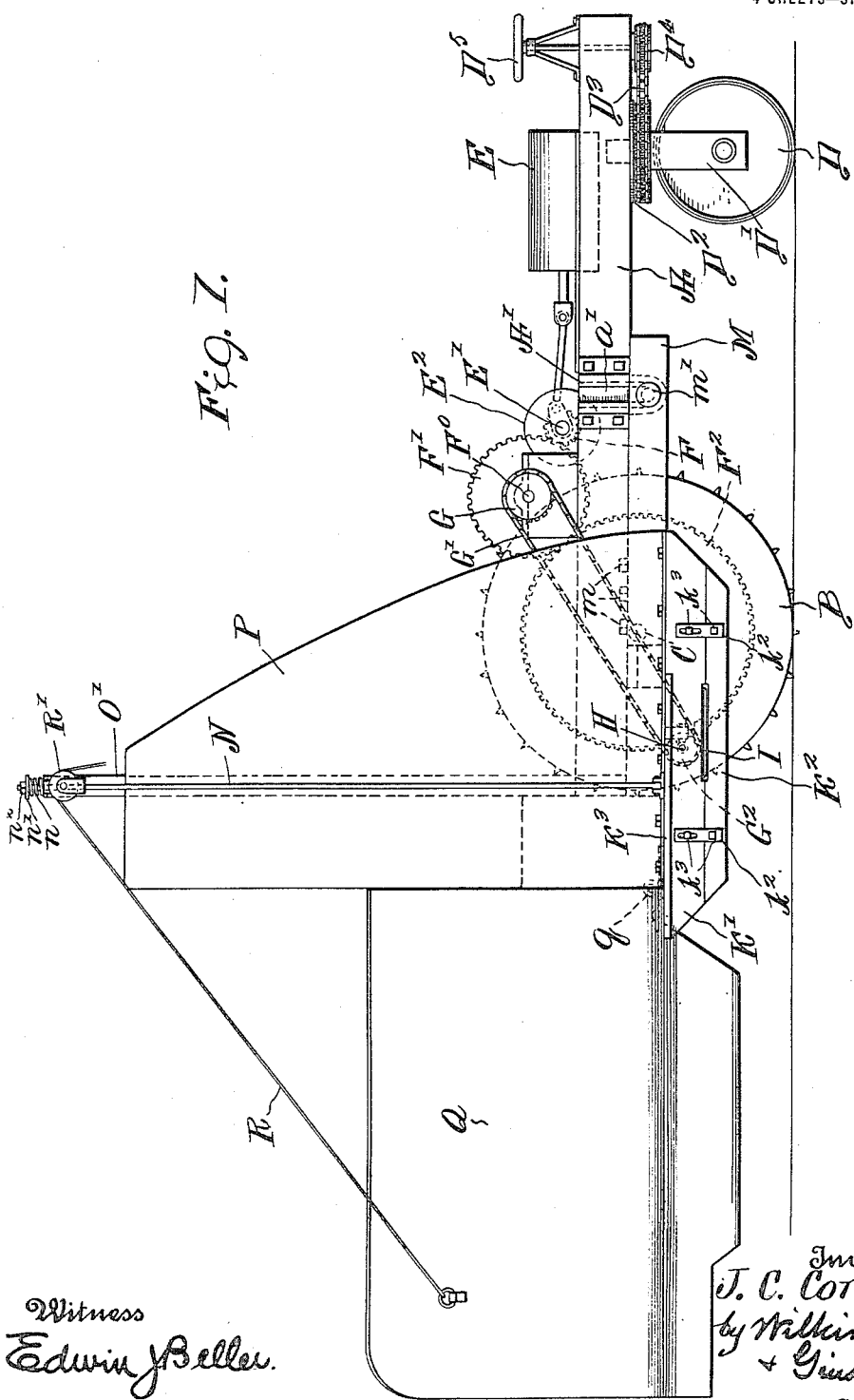

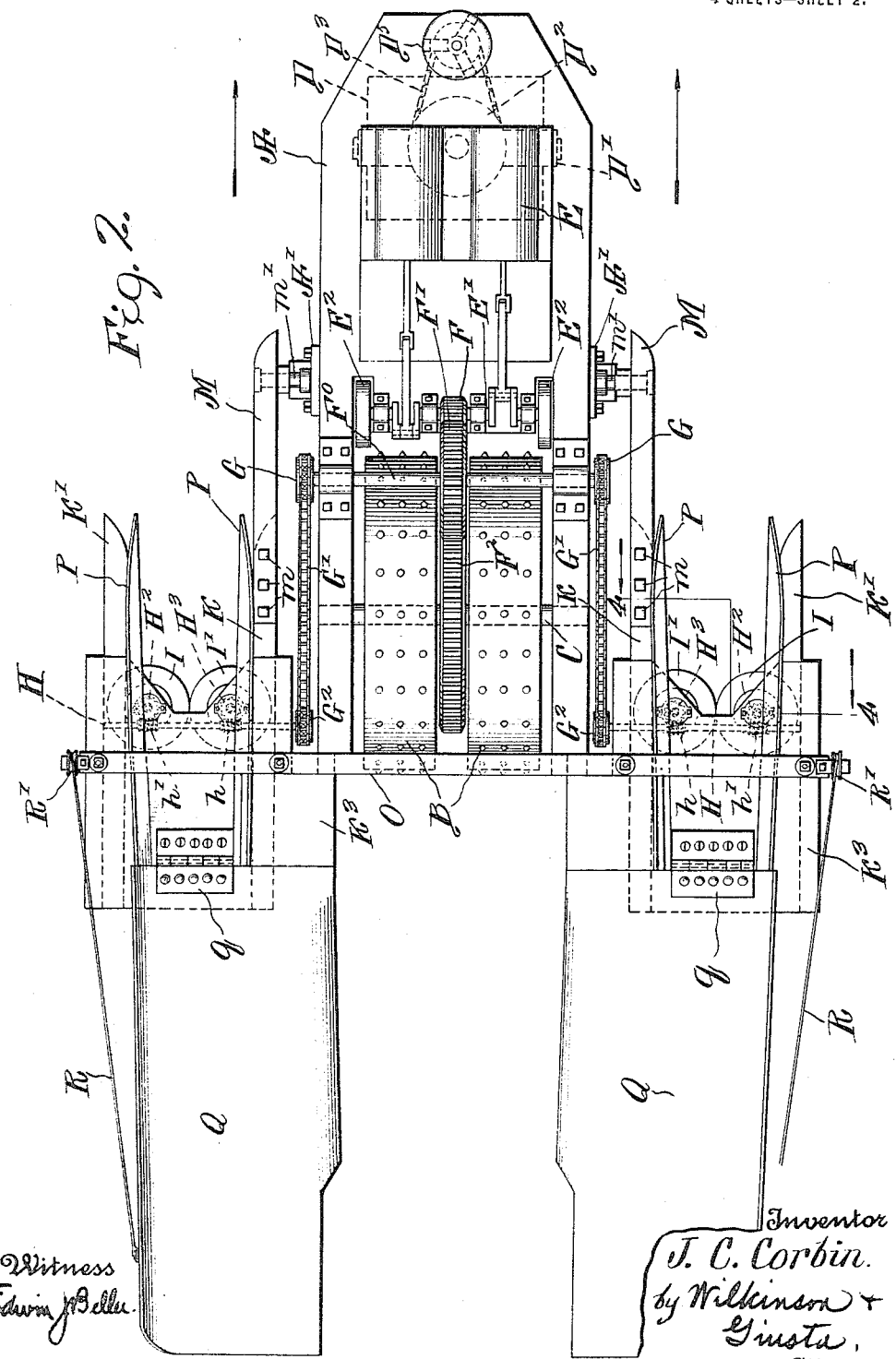

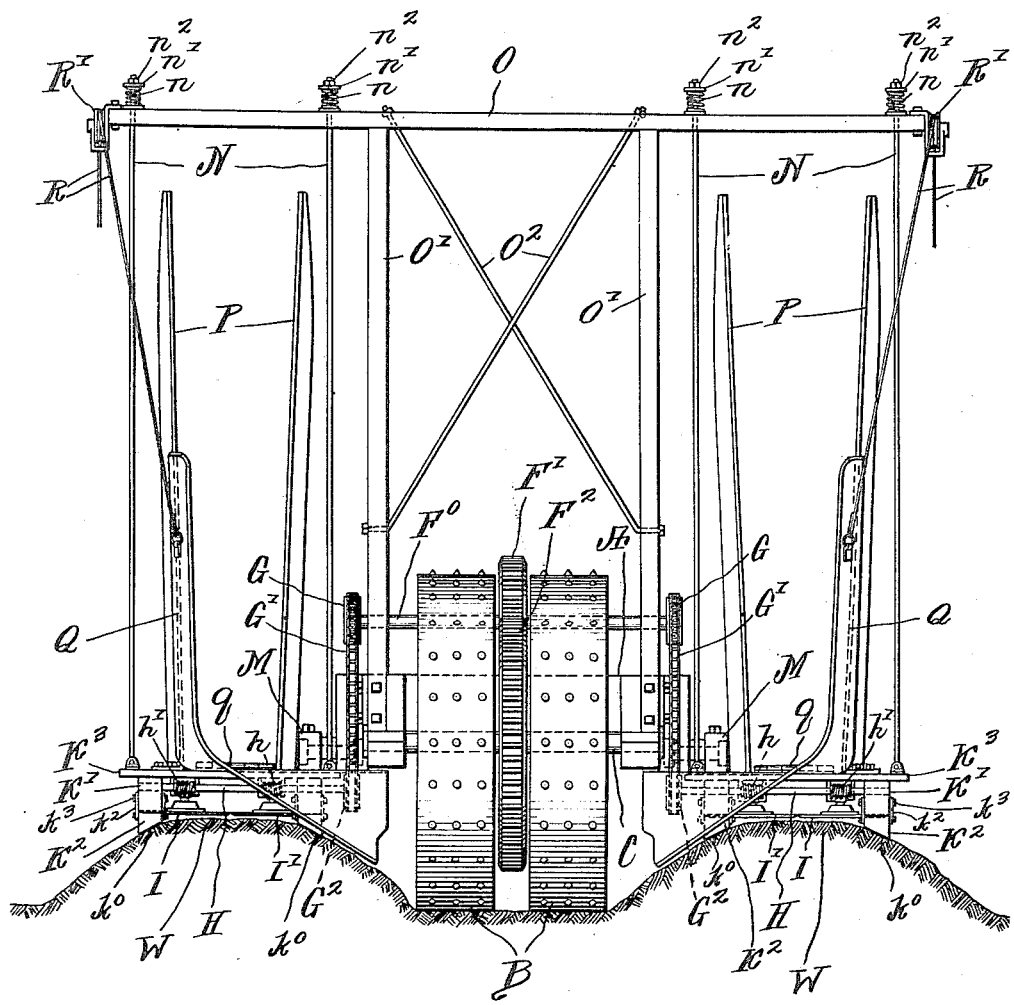

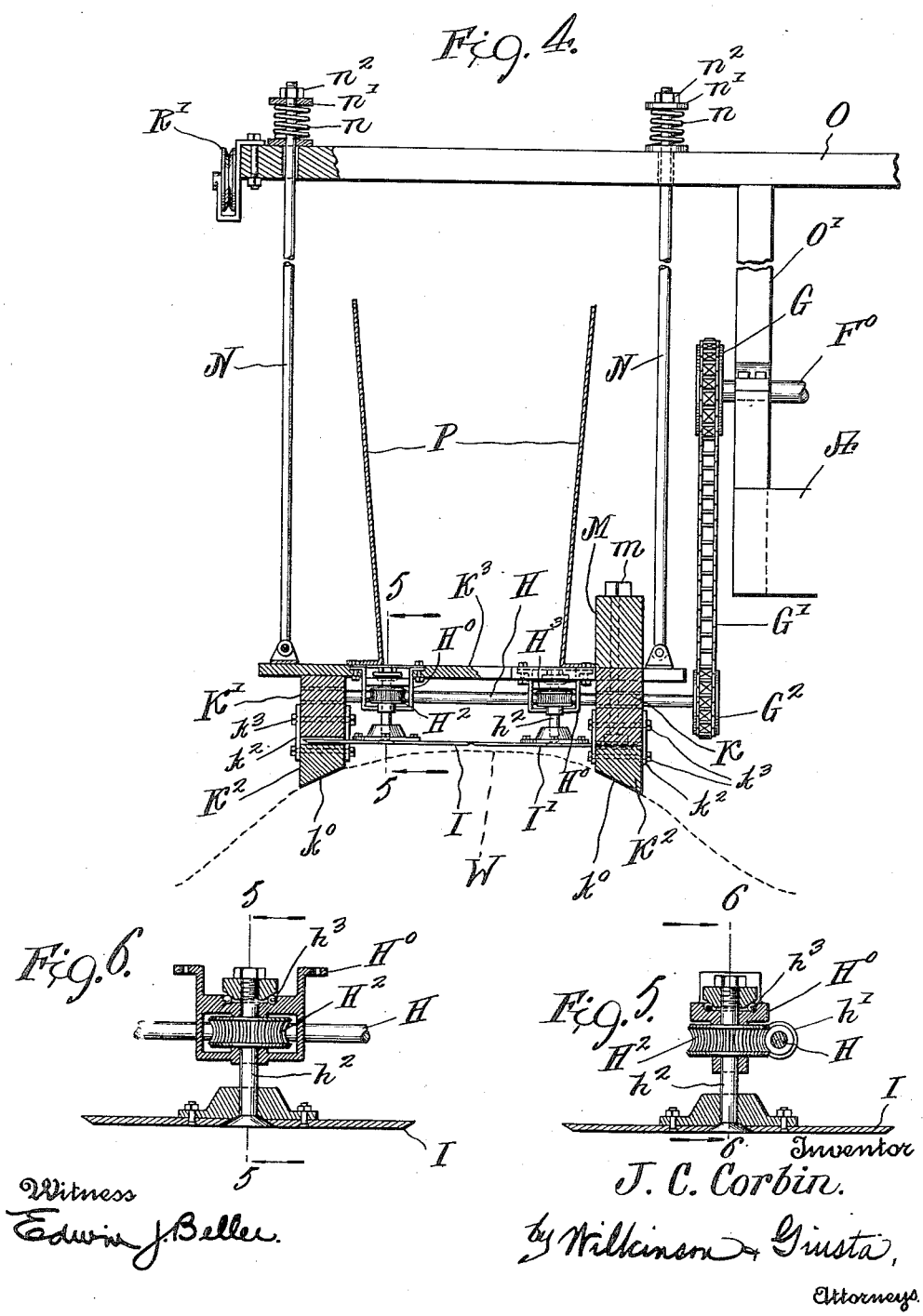

JOHN CURRY CORBIN, OF MANSFIELD, LOUISIANA.

SUGAR-CANE-WINDROWING MACHINE.

1,276,623.

Specification of Letters Patent.

Patented Aug. 20, 1918.

Application filed May 16, 1918. Serial No. 235,011.

*To all whom it may concern:*

Be it known that I, JOHN CURRY CORBIN, a citizen of the United States, residing at Mansfield, in the parish of De Soto and State of Louisiana, have invented certain new and useful Improvements in Sugar-Cane-Windrowing Machines; and I do hereby declare the following to be a full, clear, and exact description of the invention, such as will enable others skilled in the art to which it appertains to make and use the same.

My invention relates to improvements in machines for wind-rowing sugar cane for the purpose of cutting the same either for use as seed cane, or to protect the same, as far as possible, against deterioration after it has been killed by frost.

The purpose of the invention is to cut a pair of adjacent rows of cane close to the ground and deposit the stalks, with the leaves and trash attached, into the furrow between said rows, thus forming what is known as a "wind-row."

Various machines have been devised for the purpose of not only cutting the cane near the ground, but of also stripping the trash from the stalks and cutting off the green tops, with the attached leaves, from the upper ends of the stalks; but such machines have been found difficult, if not impracticable, for use, for the reason that the stalks of the sugar cane are apt to be blown down and then to grow up in a crooked form, forming a tangled mass, the single stalks of which could not be stripped and topped, as far as I am aware, by any of the machines now known.

Furthermore, cane stalks are apt to be of a very uneven height, so that if the machine be set to cut off the tops for any given height, an excess of length of the longer stalks would be removed, while the shorter stalks would be left with a large part of the green portion and of the green leaves attached, so that the results from such cutting and topping machines have hitherto been very unsatisfactory.

According to my invention I do not attempt either to strip the stalks of the trash, or to cut off the tops with the green leaves attached thereto; but I merely design to cut the stalks close to the ground and deposit the same as smoothly as practicable from two adjacent rows into a single trench, thus accomplishing by machine work what has hitherto been largely effected by cane cutters using cane knives and operating by hand.

My invention will be more fully understood after reference to the accompanying drawings, in which similar parts are indicated by like reference symbols throughout the several views, and in which:—

Figure 1 shows a side elevation of the complete machine, parts, such as the driver's seat, the hoisting drum and other attachments, being omitted for the sake of clearness in the drawings.

Fig. 2 is a plan view of the machine shown in Fig. 1.

Fig. 3 is a rear view of the machine.

Fig. 4 is a sectional view, on a larger scale, showing a section along the broken line 4—4 of Fig. 2, and looking in the direction of the arrows.

Fig. 5 shows a section on a still larger scale, along the line 5—5 of Fig. 4, and looking in the direction of the arrows, parts being shown in elevation; and Fig. 6 shows a section along the line 6—6 of Fig. 5, parts being shown in elevation.

A represents the main frame of the machine supported upon the traction wheels B and the steering wheel D, which wheels are of narrow gage and adapted to travel in the trench between the adjacent rows, as shown in Fig. 3.

The traction wheels B are mounted on the axle C beneath the main frame; and the steering wheel D is journaled in the yoke D' mounted beneath the turn-table $D^2$ and rotated by the sprocket chain $D^3$, engaging the sprocket pinion $D^4$, controlled by the steering wheel $D^5$.

E represents the driving engine which may be of any suitable or preferred type. I have shown this engine, diagrammatically in Figs. 1 and 2, composed of two cylinders, but any desired number of cylinders may be used.

This engine drives the main shaft E' having the fly wheels $E^2$, and this shaft carries the pinion F meshing in the intermediate gear wheel F', which engages the spur wheel $F^2$ mounted on the axle C, and thus the traction wheels B may be driven backward or forward as desired.

Obviously suitable mechanism for controlling the engine and for reversing the same could be supplied, but these not being a part of my invention are not shown, for the sake of clearness in the drawings.

The intermediate gear F' is mounted on the shaft F° carrying the two sprocket wheels G engaging the sprocket chain G' for rotating the cutting knives as the machine advances. These sprocket wheels G engage in the sprocket chain G', which chain engages in the sprocket wheels $G^2$ carried by the worm shaft H, which worm shaft is provided with a pair of worms $h$ and $h'$ engaging with the corresponding worm wheels $H^2$ and $H^3$ which are mounted on the corresponding shafts $h^2$, and drive the circular knives I and I'.

These knives I and I' are driven in reverse directions as shown.

The shafts $h^2$ are journaled in suitable bearing boxes H°, and are preferably provided with anti-friction bearings $h^3$, as shown in Figs. 5 and 6.

There is one shaft H on each side of the machine for each row of cane to be cut, and this shaft is journaled in the longitudinal beams K and K' which are connected together by the floor $K^3$, and are supported from the main frame A, as will be hereinafter described.

Each of these beams K and K' carries a shoe $K^2$, shown most clearly in Fig. 4, which may be adjustably connected to the beam above by means of the slotted links $k^2$ and bolts $k^3$, as shown in Figs. 1 and 4.

These shoe pieces $K^2$ preferably taper outward, as shown at $k°$, to conform to the general shape of the upper portion of the cane row W, as shown in Figs. 3 and 4.

The inner beam K' of each pair is shown as secured to a longitudinal beam M by means of bolts $m$. This longitudinal beam M is provided near its forward end with a stud $m'$ which engages in a guide groove $a'$ in a socket plate A' secured to the side of the main frame, as shown in Fig. 1.

Thus the front end of each beam M may be moved up or down as desired. The rear end of each beam M is connected to the floor $K^3$ and is supported by the rods N which pass upward through the cross piece O, supported by the stanchions O' from the main frame A.

The upper ends of these rods N are screw-threaded to receive the nuts $n^2$ engaging the washers $n'$ mounted above the springs $n$, so that the shoes $K^2$ and the parts above the same are given a spring support from the cross piece O, and the shoes $K^2$ may be raised or lowered through a small distance by screwing up or easing off the nuts $n^2$. In the same way the shoes $K^2$ may be adjustably connected to the beams K and K' by adjusting the link $k^2$.

The stanchions O' may be braced in any convenient way as by the tie rods $O^2$.

Front guards P are provided to guide the upper parts of the cane stalks to the proper position relative to the machine, and inclined rear guards Q are hinged to the machine so as to direct the cut cane to the center of the wind-row. These rear guards Q are hinged, as at $q$, to the floor $K^3$ and may be swung up when desired, as when turning the machine, by means of suitable hoisting ropes or chains R passing over the pulleys R' carried by the cross piece O.

The operation of the device is as follows:

The machine is self-propelled to the field and the steering roller D is centered in between the rows, and the machine is propelled forward. The stalks of cane will be centered between the front guards P and directed to the rotary cutting knives which will cut the stalks close to the surface of the ground, without disturbing the dead leaves or trash, or the green leaves, and the entire stalks will topple backward, falling on the floor $K^3$ and on the inclined rear guards Q, from which the stalks will be deflected into the trench between the rows and will form a continuous mat in the rear of the machine as the machine is propelled forward through the cane field.

It will be seen that the stalks will be directed well toward the center of the trench or furrow between the rows, leaving the sides of the hills next the trench bare, and if desired the machine may be followed up by an ordinary plow throwing a furrow of dirt over the edges of the mat, and thus protecting the same from the weather.

After reaching the end of the pair of rows, the machine may be turned in the usual way, and for convenience when turning the rear guards may be partly lifted by means of the ropes or chains R.

Since the height of the rows will differ with different fields, it may be desirable to adjust the height of the shoes $K^2$ either by turning the nuts $n^2$ or by adjusting the links $k^2$. The ordinary inequalities of the height of the rows will be taken care of by the springs $n$ which will cause the shoes $K^2$ to skim along the edge of the ground.

It will be seen that each entire side frame, carrying its pair of shoes $K^2$, has a slight vertical play, the weight of the frame and component parts being carried by the springs $n$, and thus the rotary cutting knives will always be free to travel close to the ground; it being especially desirable to cut the cane close to the surface of the ground not only to secure as much as possible of the sweetest part of the cane, but also to prevent injury to the next year's crop from having the stalks cut too high above the ground.

It will be obvious that various modifications might be made in the herein described apparatus, and in the construction, combination and arrangement of parts which could be used without departing from the spirit of my invention.

Having thus described my invention what I claim and desire to secure by Letters Patent of the United States is:—

1. A cane wind-rowing machine, comprising a frame and an engine carried thereby, narrow gage wheels supporting said frame and adapted to pass in the trench between adjacent rows of cane, a pair of spring supported secondary frames mounted, respectively, at each side of said main frame, means for vertically adjusting the said secondary frames relative to said main frame, a pair of rotary cutting knives carried by each of said secondary frames, means operated by said engine for rotating said knives, and guards for the cane stalks adapted to direct the cut stalks into the trench between adjacent cane rows, substantially as described.

2. A cane wind-rowing machine, comprising a frame and an engine carried thereby, narrow gage wheels supporting said frame and adapted to pass in the trench between adjacent rows of cane, a pair of spring supported secondary frames mounted, respectively, at each side of said main frame, shoes adjustably connected to the bottom of said secondary frames and adapted to skim along the surface of the ground, a pair of rotary cutting knives carried by each of said secondary frames, means operated by said engine for rotating said knives, and guards for the cane stalks adapted to direct the cut stalks into the trench between adjacent cane rows, substantially as described.

3. A cane wind-rowing machine, comprising a frame and an engine carried thereby, narrow gage wheels supporting said frame and adapted to pass in the trench between adjacent rows of cane, a pair of spring supported secondary frames mounted, respectively, at each side of said main frame, shoes adjustably connected to the bottom of said secondary frames and adapted to skim along the surface of the ground, means for vertically adjusting the said secondary frames relative to said main frame, a pair of rotary cutting knives carried by each of said secondary frames, means operated by said engine for rotating said knives, and guards for the cane stalks adapted to direct the cut stalks into the trench between adjacent cane rows, substantially as described.

4. A cane wind-rowing machine, comprising a frame and an engine carried thereby, narrow gage wheels supporting said frame and adapted to pass in the trench between adjacent rows of cane, a pair of secondary frames mounted, respectively, at each side of said main frame, a pair of rotary cutting knives carried by each of said secondary frames, means operated by said engine for rotating said knives, and fixed front guards and hinged rear guards for the cane stalks adapted to direct the cut stalks into the trench between adjacent cane rows, with means for raising and lowering said rear guards when desired, substantially as described.

5. A cane wind-rowing machine, comprising a frame and an engine carried thereby, narrow gage wheels supporting said frame and adapted to pass in the trench between adjacent rows of cane, a pair of secondary frames mounted, respectively, at each side of said main frame, means for vertically adjusting the said secondary frames relative to said main frame, a pair of rotary cutting knives carried by each of said secondary frames, means operated by said engine for rotating said knives, and fixed front guards and hinged rear guards for the cane stalks adapted to direct the cut stalks into the trench between adjacent cane rows, with means for raising and lowering said rear guards when desired, substantially as described.

6. A cane wind-rowing machine, comprising a frame and an engine carried thereby, narrow gage wheels supporting said frame and adapted to pass in the trench between adjacent rows of cane, a pair of spring supported secondary frames mounted, respectively, at each side of said main frame, a pair of rotary cutting knives carried by each of said secondary frames, and means operated by said engine for rotating said knives, substantially as described.

7. A cane wind-rowing machine, comprising a frame and an engine carried thereby, narrow gage wheels supporting said frame and adapted to pass in the trench between adjacent rows of cane, a pair of spring supported secondary frames mounted, respectively, at each side of said main frame, means for vertically adjusting the said secondary frames relative to said main frame, a pair of rotary cutting knives carried by each of said secondary frames, and means operated by said engine for rotating said knives, substantially as described.

8. A cane wind-rowing machine, comprising a frame and an engine carried thereby, narrow gage wheels supporting said frame and adapted to pass in the trench between adjacent rows of cane, a pair of spring supported secondary frames mounted, respectively, at each side of said main frame, shoes adjustably connected to the bottom of said secondary frames and adapted to skim along the surface of the ground, a pair of rotary cutting knives carried by each of said secondary frames, and means operated by said engine for rotating said knives, substantially as described.

9. A cane wind-rowing machine comprising a frame and an engine carried thereby, narrow gage wheels supporting said frame and adapted to pass in the trench between adjacent rows of cane, a pair of spring supported secondary frames mounted, respectively, at each side of said main frame, shoes adjustably connected to the bottom of said secondary frames and adapted to skim along the surface of the ground, means for vertically adjusting the said secondary frames relative to said main frame, a pair of rotary cutting knives carried by each of said secondary frames, and means operated by said engine for rotating said knives, substantially as described.

In testimony whereof I affix my signature.

JOHN CURRY CORBIN.